United States Patent [19]

Naganuma et al.

[11] Patent Number: 4,792,230
[45] Date of Patent: Dec. 20, 1988

[54] METHOD AND APPARATUS FOR MEASURING ULTRASHORT OPTICAL PULSES

[75] Inventors: Kazunori Naganuma, Katsuta; Juichi Noda, Mito, both of Japan

[73] Assignee: Nippon Telegraph and Telephone Corporation, Tokyo, Japan

[21] Appl. No.: 93,653

[22] Filed: Sep. 8, 1987

[30] Foreign Application Priority Data

Sep. 8, 1986 [JP] Japan ................................. 61-211100
Mar. 27, 1987 [JP] Japan ................................. 62-73547

[51] Int. Cl.⁴ ............................................. G01B 9/02
[52] U.S. Cl. ....................................... 356/345; 356/346
[58] Field of Search ...................... 356/345, 346, 349; 307/427

[56] References Cited

U.S. PATENT DOCUMENTS 4,505,587  3/1985  Haus et al. ........................... 356/345
4,705,397  11/1987  Tsuchiya et al. ..................... 356/345

Primary Examiner—Davis L. Willis
Assistant Examiner—Matthew W. Koren
Attorney, Agent, or Firm—Cushman, Darby & Cushman

[57] ABSTRACT

A method and apparatus for measuring ultrashort optical pulses is described. Pulse waveforms to be measured are the type which vary at high speed in a time close to or less than the response time of an optical detector. Changes of optical wavelength or frequency are measured at various sections of that pulse. The light to be measured is split into two beams, and recombined after provided with different delay times, respectively. The combined light is caused to enter a doubling crystal to generate a second-harmonic light, and the second-harmonic light component, or both the second-harmonic and fundamental components, is measured. The intensity shape and chirping of the pulses is obtained from the changes in the intensity of these components as a function of delay time difference by Fourier analysis including iterative arithmetic operations.

27 Claims, 11 Drawing Sheets

Second harmonics path difference

Fundamental path difference

Fourier analysis $|\tilde{I}|^2$ $|\tilde{U}|^2$ $\omega_0$   $2\omega_0$

Frequency $|\tilde{E}|^2$ $\omega_0$   $2\omega_0$

Frequency

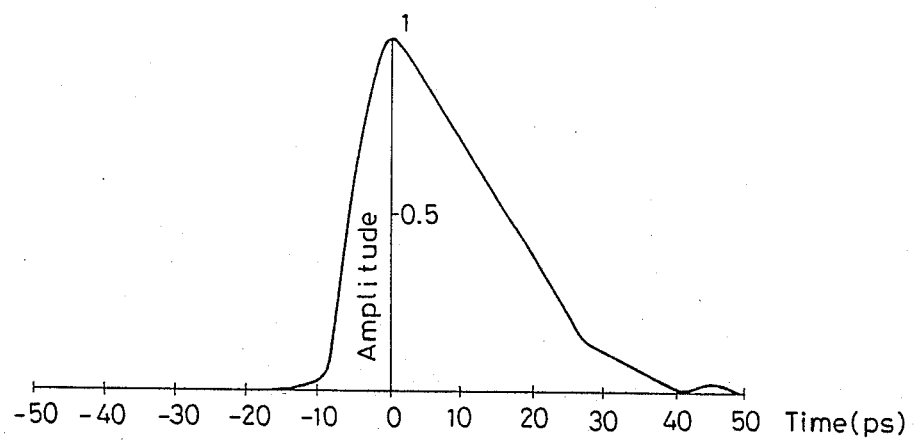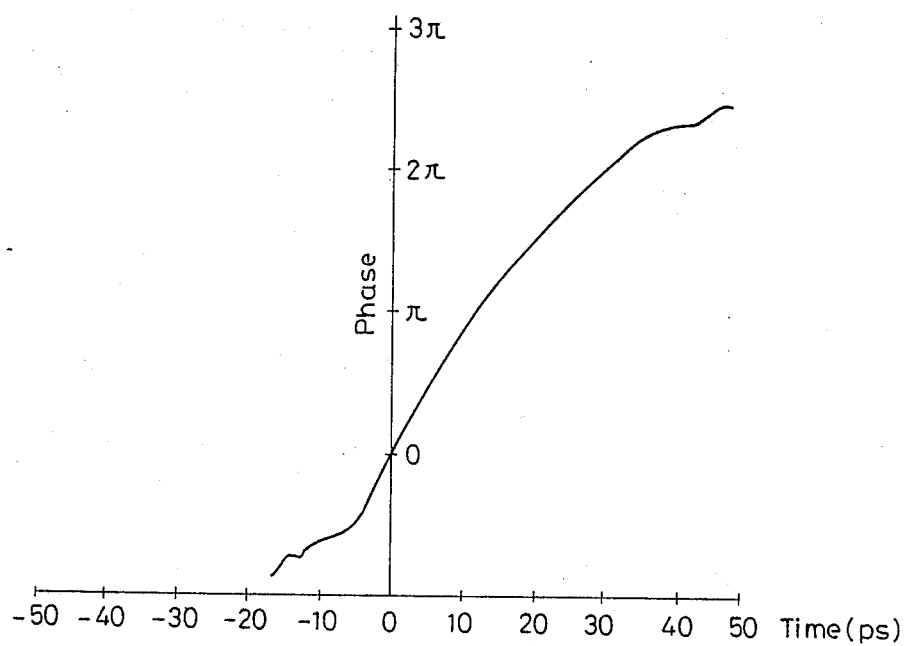
F I G. 16

METHOD AND APPARATUS FOR MEASURING ULTRASHORT OPTICAL PULSES

BACKGROUND AND SUMMARY OF THE INVENTION

This invention relates to a method and apparatus for measuring changes in shapes and wavelength (frequency) at various sections of ultrashort optical pulses. In the past, these changes have not been capable of being measured because they change too rapidly in a very short time. Because this time is close to or less than the response time of currently available optical detectors, these detectors could not measure these changes. More particularly, the invention relates to a method and apparatus for measuring ultrashort optical pulses, which measures in detail both an intensity shape and a phase shape of pulses which correspond to an integration of a change of instantaneous frequency (chirping) when the optical pulses form pulse sequences that periodically repeat at a fixed time interval.

FIG. 1 is a schematic diagram of a conventional, prior art, measuring device for measuring ultrashort optical pulses. A pulsed light beam to be measured 100 is shown incident on beam splitter 24. A portion of the pulsed light beam to be measured 100 is reflected by beam splitter 24 to enter a spectrum measurement system 102, and the rest of the beam enters an intensity autocorrelation measurement system 104. The spectrum measurement system 102 has a high-resolution spectroscope 26 mounted with a wavelength scanner (a scanning mechanism) 27, a converging lens 25 which focuses the light beam at the incident slit 106 of the spectroscope 26, an optical detector 28, and an integrating amplifier 29 which amplifies the output voltage from the optical detector 228.

In the intensity autocorrelation measurement system 104, the incident light beam is divided into two light beams by a further beam splitter 1. One of the split beams is reflected by a fixed prism 2 while the other beam is reflected by a movable prism 3, which is movable along the optical axis by a mover 4. These two reflected beams are recombined by the beam splitter 1. The optical system comprising the beam splitter 1 and two prisms 2, 3 is called a Michelson interferometer.

Assuming an electric field of the light before entering into the Michelson interferometer is denoted as E(t) as a function of the time t, the electric field after the recombination can be expressed as:

$$[E(t)+E(t-\tau)]/2$$

where the delay time $\tau$ is a time delay due to the path difference. This amount can be obtained by dividing a relative path length difference l, between the path extending through the prism 2 and the path extending through the prism 3, by a light velocity c. Since the prism 3 can be moved by mover 4, $\tau$ can be changed arbitrarily.

After recombination, the light beam is focused by lens 5 at a doubling crystal 7. This crystal 7 generates second harmonic light, that is. light having a wavelength of one half of that of the incident light. The electric field, $E_2(t)$, of this second harmonic light is proportional to $[E(t)+E(t-\tau)]^2$. The output light from the crystal 7 is focused by a lens 6 at an optical detector 9. However, optical filter 8 is disposed between lens 6 and detector 9, and allows only the second harmonic light to pass therethrough and to reach the optical detector 9. Since the response time of the optical detector 9 is significantly longer than the duration of the optical pulses to be measured, and of the second harmonic pulses generated from the crystal 7, it cannot accurately detect the shapes of the second harmonic light pulses. Therefore, the pulse shape of an output voltage from the detector 9 has inherent inaccuracies as compared with what the voltage should be. A time integration of the pulse shapes, i.e. their area, however, is proportional to the energy of the second harmonic light pulses. The output voltage pulses from the detector 9 are converted into a constant voltage proportional to the area of said output voltage pulses by an integrating amplifier 10 with a large time constant T.

The operation of the conventional device to measure ultrashort pulses is described below.

First, a signal selector switch 31 is switched to a first position to connect an A/D converter 32 to the output of spectrum measuring system 102. The central wavelength of spectroscope 26 is then scanned at a constant rate by wavelength scanner 27, while the output voltage of the detector 28 is read-in and stored time-sequentially in a computer 18 via A/D converter 32. In this way, a data sequence representing spectrum D as a function of wavelength, or $D(\lambda)$, of the optical pulses is obtained by this first measurement. For a second measurement, signal selector switch 31 is switched to a second position to connect A/D converter 32 to intensity autocorrelation measurement system 104. While mover 4 moves prism 3 at a constant speed, the output voltage from integrating amplifier 10 is read-in and stored time-sequentially in computer 18 via the A/D converter 32. A cutoff frequency, which is the reciprocal of the time constant T of the integrating amplifier 10, is set sufficiently lower than a central frequency $f_0$ of the optical pulses. This central frequency $f_0$ is determined by the central wavelength $\lambda_0$ of the optical pulses to be measured, and the speed of mover 4, using the equation:

$$f_0 = 2V/\lambda_0 \tag{1}$$

The data sequence thus obtained is proportional to $1+2G_2(\tau)$, where $G_2(\tau)$ is an intensity autocorrelation and can be expressed as a function of the intensity shape of pulses I(t) as follows:

$$G_2(\tau) = \int_{-\infty}^{\infty} I(t) I(t-\tau)\, dt / \int_{-\infty}^{\infty} I(t) I(t)\, dt \tag{2}$$

The measurement process ends at this point, and the analyzing process begins.

The spectrum $D(\lambda)$ is then converted to a spectrum $D(\omega)$ as a function of frequency w. When an electric field of the object pulses is denoted as E(t), and its Fourier transformation as $\tilde{E}(\omega)$, the absolute value of $\tilde{E}(\omega)$, i.e. $|\tilde{E}(\omega)|$, can be obtained from a square root of $D(\omega)$ as follows:

$$|\tilde{E}(\omega)| = \sqrt{D(\omega)} \tag{3}$$

The electric field of the object pulses E(t) can be completely reconstructed from a phase $\phi(\omega)$ in the Fourier component of the relation:

$$\tilde{E}(\omega) = |\tilde{E}(\omega)| \exp[i\phi(\omega)] \tag{4}$$

(where i is an imaginary unit) Then, $\phi(\omega)$ is expanded around the central wavelength $\omega_0$ of the spectrum as:

$$\phi(\omega)=\phi_0+(\omega-\omega_0)p+(\omega-\omega_0)^2 q+(\omega-\omega_0)^3 r \qquad (5)$$

where $\phi_0$ denotes an arbitrary constant, and p only provides a correction for the central frequency $\omega_0$ of the spectrum, and does not affect the intensity shape. Therefore, only the expansion coefficients q and r can be determined by this method. In order to obtain the values of q and r, the known, least-squares method is employed and values are adjusted until $G_{tr}(\tau)$, calculated according to the two equations below, coincides with an actually measured intensity autocorrelation as closely as possible.

$$E_{tr}(t) = \frac{1}{\sqrt{2\pi}} \int_{-\infty}^{\infty} \sqrt{D(\omega)} \exp[i(\omega-\omega_0)^2 q + i(\omega-\omega_0)^3 r - i\omega t]\, d\omega \qquad (6)$$

$$G_{tr}(\tau) = \frac{\int_{-\infty}^{\infty} |E_{tr}(t)|^2 |E_{tr}(t-\tau)|^2\, dt}{\int_{-\infty}^{\infty} |E_{tr}(t)|^4\, dt} \qquad (7)$$

By this method, $\phi(\omega)$ is approximated with a precision as high as third order. After calculating $E_{tr}(t)$ from the above equation, the intensity shape and the phase shape of the measured pulses can be calculated from $|E_{tr}(t)^2|$ and $\arg[E_{tr}(t)]$ respectively. The instantaneous frequency and wavelength at various points on pulses can be obtained from time derivatives of their phase shape.

However, although this method can provide an analysis of coefficients of $\phi(\omega)$ with accuracy to third-order, this method cannot reproduce in detail the intensity shape and phase shape of arbitrarily shaped pulses. Although the situation can be improved by obtaining a higher-order expansion coefficient of $\phi(\omega)$, this is difficult and impractical, as the calculation time would be greatly increased.

Another great difficulty with this prior art method arises from the requirement for proper spectrum measurement of a spectroscope 26 of extremely high resolution and precision. For instance, the full width at half maximum (FWHM) of spectrum is around 5 Å with a 1ps wide optical-pulse of 0.6 μm central wavelength.

Using this method to record fifty measuring points which are reasonably independent from each other within the FWHM, the spectroscope would require a resolution of less than 0.1 Å. If the width of a measured pulse becomes longer, the resolution must be improved proportionally.

Devices which meet these specifications include a diffraction grating spectrometer having a focal length longer than 1 m, and a scanning Fabry-Perot etalon. Neither of them, however, could be used to provide a simple measuring method. The former spectroscope is large in size and has a difficult-to-adjust optical alignment. The latter spectroscope requires even more careful optical alignment than the former.

As stated above, in the conventional methods of measuring ultrashort optical pulses, both a high-resolution spectroscope (for spectrum measurement) and a separate Michelson interferometer (to measure intensity autocorrelation) are needed. These are both expensive and cumbersome items. The spectroscope is especially expensive, in addition to being large and bulky, and is difficult to align. Therefore, the spectroscope has accounted for a high percentage of the cost and volume of a measuring system in the prior art, presenting a formidable problem in miniaturizing the system, reducing the cost, and simplifying adjustments such as alignment. Moreover, as the data analysis method using this structure is still a rough approximation, optical pulses could not be evaluated heretofore in detail.

The object of this invention is to obviate the aforementioned problems encountered in the prior art and to provide an ultrashort optical pulse measurement method which can measure optical pulses in detail without the necessity for a high-resolution spectroscope which makes the system bulky and costly.

The first aspect according to this invention measures ultrashort pulses repeating with a constant period. More particularly, the method for ultrashort pulse measurement described splits a measured light beam into two beams using a beam splitter. The two beams follow different paths which have a relative path difference therebetween by directing the two beams to follow different paths. The beams are recombined, and the combined beam is focused on a doubling crystal. The intensity of the second-harmonic light generated in the doubling crystal is converted to a voltage by an optical detector.

According to the first method, the changes in intensity of the second-harmonic light due to the relative path length difference are recorded, and the data thus obtained is Fourier-analyzed to obtain three spectra which are distributed at a frequency interval of the interference fringes of the fundamental wave. The intensity shape of the measured pulse is reconstructed using an inverse Fourier transformation of a spectrum closest to zero frequency among those spectra, by taking the square root of this spectrum. The phase of the measured pulse is reconstructed by iterative calculations using the square root of the spectrum closest to a frequency twice as high as that of the interference fringe of the fundamental wave and using the reconstructed intensity shape.

The second method of this invention measures ultrashort pulses repeating with a constant period. More particularly, a method for ultrashort pulse measurement wherein a measured light beam is split into two beams by a beam splitter is described. A relative path difference is provided between the two beams by letting the beams pass through different paths. Subsequently the beams are recombined, and the combined beam is focused on and enters a doubling crystal. The intensity of the second-harmonic light generated in the crystal is converted to a voltage by an optical detector. The output voltage from the optical detector is divided into two portions according to this method. One of the portions passes through a low-pass filter in order to extract a frequency component near DC. The other portion passes through a high-pass filter in order to extract a frequency component of a frequency double the measured frequency in correspondence with the frequency of the interference fringe of the fundamental wave. An amplitude of the component from the high-pass filter is obtained using an AC voltmeter. The DC and AC voltages thus obtained are recorded in time sequence while varying said relative path length difference at a constant rate, to produce a plurality of paired data sets. The data on the component near CC is Fourier-analysed, a square root is taken of the obtained spectrum, and the intensity shape of the measured pulse is reconstructed by its inverse Fourier transformation. The data on the AC voltage value are Fourier-analysed, its square root is taken, and from this resultant spectrum and the intensity shape, the phase of the measured pulse is reconstructed by iterative calculations.

Using this novel technique, autocorrelation of a second-harmonic electric field, instead of a spectrum, is performed. More particularly, these methods simultaneously measure and record the intensity autocorrelation and the autocorrelation of the second-harmonic electric field of a pulse using a Michelson interferometer and a doubling crystal as the operative components. Without the necessity for any spectroscope, the intensity shape as well as the phase shape of an optical pulse can be measured.

According to these methods, the light beams having relative path differences from traversal of a Michelson interferometer are recombined, and the resultant beam is focused, by a lens, on the doubling crystal. The second-harmonic light thus generated is transformed into a voltage by an optical detector.

The voltage from the optical detector under this condition is proportional to the formula (8):

$$1 + 2G_2(\tau) + 4F_1(\tau) \cos [\omega_0\tau + \phi_1(\tau)] + F_2(\tau) \cos [2\omega_0\tau + \phi_2(\tau)] \quad (8)$$

The first and second methods according to this invention are characterized in that $G_2(\tau)$ and $F_2(\tau)$ of the above formula are measured respectively, where $\tau$ denotes a delay time and $\omega_0 = 2\pi c/\lambda_0$ is the frequency of the central angular frequency of the measured pulse. $F_2(\tau)$ and $\theta_2(\tau)$ are defined by the equation below.

$$F_2(\tau) \exp [i\phi_2(\tau)] = \int_{-\infty}^{\infty} [\epsilon(t)]^2 [\epsilon^*(t-\tau)]^2 dt \quad (10)$$

when the electric field of the pulse E(t) is expressed by the equation:

$$E(t) = [\epsilon(t) \exp(-\omega_0 t) + \epsilon^*(t) \exp(i\omega_0 t)]/2 \quad (9)$$

where the asterisk (*) denotes a complex conjugate. The left-hand side of the equation (10) is called an autocorrelation of a second-harmonic electric field.

While the prior art methods measure only the $G_2(\tau)$ term in equation (8) using a Michelson interferometer, the present invention measures both $G_2(\tau)$ and $F_2(\tau)$ using equation (8), thereby eliminating the necessity for an additional spectrum measurement with a spectroscope.

In the analyzing stage of calculating intensity shapes $I(t)$ and $\phi(t)$ from the two autocorrelated shapes mentioned above, both the first and the second invention method perform analyses on the assumption that the pulses are symmetric pulses, which are symmetrical about a certain time point. Under this assumption, the intensity shape of the pulse $I(t)$ is reconstructed from the intensity autocorrelation shape data $G_2(\tau)$ in accordance with equation (11) below:

$$I(t) = \int_{-\infty}^{\infty} \left[ \int_{-\infty}^{\infty} G(\tau) \exp(i\omega\tau) d\tau \right]^{\frac{1}{2}} \exp(-i\omega t) dt \quad (11)$$

This calculation shows that, when pulses are symmetrical, no matter how complicated their shapes are, they can be reproduced. A Fourier transformation on an autocorrelation data $F_2(\tau)$ of the second-harmonic electric field can give the square of the absolute value of the Fourier transformed value of the square of the electric field of the measured pulse. In other words, using an assumption of symmetrical pulses, the relation below holds:

$$\int_{-\infty}^{\infty} F_2(\tau) \exp(i\omega\tau) d\tau = |\widetilde{S}(\omega)|^2 \quad (12)$$

On the other hand, $[\epsilon(t)]^2$ can be expressed using the phase $\phi(t)$ of the pulse and the intensity shape $I(t)$ as:

$$[\epsilon(t)]^2 = I(t) \exp[2i\phi(t)]$$

If the above is combined with the definition of $\widetilde{S}(\omega)$, the relation below holds:

$$\int_{-\infty}^{\infty} I(t) \exp[2i\phi(t) + i\omega t] dt = \widetilde{S}(\omega) \quad (13)$$

If $|\widetilde{S}(\omega)|$ is calculated from data $F_2(\tau)$ using equation (12), and $I(t)$ is already obtained, then the phase $\phi(t)$ of the pulse can be obtained with a high precision by iteratively computing equation (14):

$$\exp(2i\phi_{k+1}) = \arg\{F|S|\arg(F[I \exp(2i\phi_k)])\} \quad (14)$$

where the letter F denotes a Fourier transform, and arg denotes a calculation of the phase of a complex number. The method of calculation of the equation (14) is described in detail by Gerchberg et al. in OPTIK vol. 35, p. 237.

Unlike the conventional approximate solution, which is limited to a finite order, the above analytical method, in principle, takes into consideration up to an infinite order, and can calculate the intensity shape and phase of a measured pulse at an arbitrarily high precision.

When a second-harmonic electric field is expressed as a function of time t as u(t), a square root of the spectrum close to a frequency double the interference fringe of the fundamental wave is an absolute value $|\bar{u}(\omega)|$ of a Fourier-transformed u(t), i.e $\bar{u}(\omega)$. A square root of the spectrum close to zero frequency (DC) is an absolute value $|\bar{I}(\omega)|$ of the Fourier-transformed intensity shape $I(t) = |u(t)|$, i.e. $\bar{I}(\omega)$. If u(t) is a symmetric pulse about a given time point, $|\bar{u}(\omega)|$ and $|\bar{I}(\omega)|$ described above provide sufficient information to obtain the intensity shape $I(t)$ and phase shape $(\frac{1}{2})\arg[u(t)]$. If it is not a symmetric pulse, however, this is not sufficient information to accurately reconstruct the pulse.

In addition to the dependence of the measured second-harmonic intensity on the relative path difference, if the spectrum of the measured pulse is obtained, this data will be sufficient to reconstruct the asymmetric pulses. However, if a high resolution spectroscope is introduced for the measurement of the spectrum, the system will become bulky in size and expensive in cost, failing to achieve the purpose of this invention.

In order to solve this dilemma, the present inventors conceived a measurement method in which an optical detector was newly added to the above system to measure the intensity of a fundamental wave light without a spectroscope. If the output from this optical detector is recorded in time sequence while varying the relative path difference, it is essentially measuring what is otherwise obtained by performing an inverse Fourier transformation on the spectrum of the measured pulse (which is called an interferogram). When the obtained data is Fourier-transformed, then its spectrum is obtained.

The third method according to this invention comprises the steps of splitting an object light beam into two beams, varying the relative path difference of the split paths, recombining those two light beams, making the combined beam enter a crystal with a doubling ability to generate second-harmonic light, converting the intensities of the fundamental wave and the second-harmonic light into electric signals proportional thereto, recording the changes in intensity of the fundamental light and the second-harmonic light due to the relative path difference, and performing Fourier-analysis on the recorded data to calculate an intensity shape and a phase shape of the measured pulse.

In the calculation performed according to this third method, a Fourier-transformation of an electric field of the measured pulse is obtained as the spectrum close to the fundamental frequency $\omega_0$, by Fourier-analyzing the intensity-change data of the fundamental light. A Fourier-transformation of a second-harmonic electric field is obtained as a spectrum close to $2\omega_0$ by Fourier-analyzing the intensity change data of second-harmonic light. A Fourier-transformation of the intensity of the measured optical pulse is obtained as a spectrum close to zero frequency DC. Based on these three Fourier-transformations, iterative calculations are performed.

This method measures the intensities of not only the second-harmonics but also of the fundamental wave light having the same wavelength as the original optical pulse using separate optical detectors to convert them into voltages.

The output voltage of the optical detector which measures the intensity of the fundamental light can be expressed as follows:

$$1 + Re[G_1(\tau) \exp(-i\omega_0 \tau)] \quad (15)$$

wherein $\tau$ denotes a delay time, $\omega_0 = 2\pi c/\lambda_0$ the central angular frequency of the measured pulse, and the symbol Re denotes taking the real part of a complex number. If the electric field $E_0(t)$ is represented as:

$$E_0(t) = Re[E(t) \exp(-i\omega_0 \tau)] \quad (16)$$

$G_1(\tau)$ is referred to as an electric autocorrelation function and expressed as below.

$$G_1(\tau) = \int_{-\infty}^{\infty} \Sigma(t) E^*(t - \tau) dt \quad (17)$$

When the data $G_1(\tau)$ is Fourier-transformed, the square of the absolute value of the Fourier-transform $\widetilde{E}(\omega)$ of the electric field $E(t)$ of the measured pulse is obtained, i.e.

$$\int_{-\infty}^{\infty} G_1(\tau) \exp(i\omega\tau) d\tau = |\widetilde{E}(\omega)|^2 \quad (18)$$

The right-hand side of the above equation expresses the spectrum of the optical pulse. When a spectrum of light is measured by an interferometer instead of a spectroscope, this method is called Fourier-transform spectroscopy.

The output voltage of the optical detector which measures the intensity of the second-harmonics is proportional to equation (19)

$$1 + 2G_2(\tau) + 4Re[F_1(\tau) \exp(i\omega_0\tau)] + Re[F_2(\tau) \exp(2i\omega_0\tau)] \quad (19)$$

The intensity I(t) of the optical pulse and the electric field of the second-harmonics u(t) are defined as follows:

$$I(t) = E(t)E^*(t) \quad (20)$$

$$u(t) = E(t)E(t) \quad (21)$$

Equations (22) and (23) define how I(t), u(t), the intensity correlation function $G_2(\tau)$ and the correlation function of the second-harmonic electric field $F_2(\tau)$ can be used to obtain the desired values as below.

$$G_2(\tau) = \int_{-\infty}^{\infty} |(t)|(t - \tau) dt \quad (22)$$

$$F_2(\tau) = \int_{-\infty}^{\infty} u(t)u^*(t - \tau) dt \quad (23)$$

By Fourier-transforming the above, the square of the absolute value of the Fourier-transform $\widetilde{I}(\omega)$ of the intensity I(t) of each optical pulse, and the square of the absolute value of Fourier-transform $\widetilde{u}(\omega)$ of the second-harmonic electric field u(t) are obtained as follows.

$$\int_{-\infty}^{\infty} G_2(\tau) \exp(i\omega\tau) d\tau = |\widetilde{I}(\omega)|^2 \quad (24)$$

$$\int_{-\infty}^{\infty} F_2(\tau) \exp(i\omega\tau) d\tau = |\widetilde{u}(\omega)|^2 \quad (25)$$

This inventor of the present invention has conceived a Fourier analyses what is obtained by subtracting a flat DC component from the second-harmonic intensity expressed by equation (19). FIG. 11A shows the signals expressed by equation (19), with FIG. 11C showing the Fourier-transformed values thereof. The cycle of oscillation apparent from the signals coincides with the central wavelength ($\lambda_0$) of the measured light. This corresponds to the period of the optical oscillation of the measured light when the relative path difference is divided by the light velocity, and could be substituted by a delay time.

If this signal is Fourier-analysed, three peaks appear as shown in FIG. 11C. The middle peak is due to an apparent oscillating component in the signals and located close to the frequency $\omega_0$ of the optical oscillation of the measured light. This frequency $\omega_0$ is the frequency of an interference fringe of the fundamental wave. A result of the Fourier-analysis shows other peaks near zero frequency and near $2\omega_0$. These three peaks originate from the three terms in equation (19). $G_2(\tau)$, $F_1(\tau)$ and $F_2(\tau)$ of equation (19) can be easily separated from each other by performing a Fourier-analysis on the whole signals of the equation (19) as they are differentiated by a carrier wave frequency $\omega_0$ which varies more quickly than those three. $|\widetilde{I}(\omega)|^2$ of equation (24) is obtained from a peak close to zero frequency, while $|\overline{u}(\omega)|^2$ of equation (25) is obtained by extracting a peak near $2\omega_0$ and translating it by $-2\omega_0$.

By performing Fourier-analysis on the intensity signals of the fundamental wave light from which a flat DC component has been subtracted, a peak centered at $\omega_0$ is obtained as shown in FIG. 11D. By translating this peak by $-\omega_0$, $|\widetilde{E}(107)|^2$ of equation (18) is obtained.

As shown above, when a Fourier-analysis is performed on the data indicative of the dependence of the intensities of the fundamental wave light and second-harmonic light on relative path difference (delay time), the quantities (functions) below are obtained:

$$|\overline{I}(107)|^2, |\overline{u}(\omega)|^2, |\widetilde{E}(\omega)|^2$$

Using thus obtained $|\overline{I}(107)|$, $|\overline{u}(\omega)|$, and $|\widetilde{E}(\omega)|$, calculations are iteratively performed to reconstruct the original optical pulse. FIG. 12 shows this calculation method, wherein the letters F.T. denote a Fourier-transformation, I.F.T. denote an inverse Fourier-transformation and csqrt denotes calculation of a square root of a complex number. The reconstruction of a pulse can be reduced, in principle, to obtain the phase of a Fourier-transformation $\widetilde{E}(\omega)$ of an electric field $E(t)$. This is because as the absolute value $|\widetilde{E}(\omega)|$ of the Fourier-transformation has been already obtained from the measured data, the Fourier-transformation $\widetilde{E}(\omega)$ will be known once its phase is known. The electric field $E(t)$ can be obtained by its inverse F transformation. The intensity shape of the measured pulse is obtained from $|E(t)|^2$ while the phase shape of the pulse is obtained from $\arg\{E(t)\}$. The iterative calculation of this invention utilizes the fact that the relationship between equations (20) and (21) hold between $E(t)$, $I(t)$, and $u(t)$, and can be used to obtain the phases of $|\widetilde{E}(\omega)|$, $|\overline{I}(\omega)|$, and $|\overline{u}(\omega)|$. More specifically, an initial preparation is made by giving a random phase to $|\widetilde{E}(\omega)|$. Using $E(t)$, obtained by its Fourier-transformation, calculation is iteratively performed from the lower left of FIG. 12. $I(t)$ and $u(t)$ are calculated from this $E(t)$ according to equations (20) and (21). $I(t)$ and $u(t)$ are then respectively Fourier-transformed. The absolute values $|\overline{I}(\omega)|$ and $|\overline{u}(\omega)|$ of thus obtained $\overline{I}(\omega)$ and $\overline{u}(\omega)$ are substituted for $|\overline{I}(\omega)|$ and $|\overline{u}(\omega)|$ which have been obtained by Fourier-analysis of the measured data at the previous stage. The difference between the values $|\overline{I}(\omega)|$ or $|\overline{u}(\omega)|$ before and after the substitution is used for judging the convergence. When there is no longer any difference between these values, the pulse can be considered to be fully reconstructed. By performing an inverse Fourier-transformation on $\overline{I}(\omega)$ and $\overline{u}(\omega)$, they are converted to $I(t)$ and $u(t)$, and the absolute value of $u(t)$ is replaced by thus obtained $I(t)$. A complex square root of $u(t)$ is taken to convert to $E(t)$. The $E(t)$ is further Fourier-transformed to obtain $\widetilde{E}(\omega)$, and its absolute value is substituted for the known $|\widetilde{E}(\omega)|$. The difference of values of $|\widetilde{E}(\omega)|$ between before an after substitution is used for judging convergence similarly to the cases of $\overline{I}(\omega)$ and $\overline{u}(\omega)$. After substitution, $E(t)$ will be obtained by an inverse Fourier-transformation on $(\omega)$, to return to the starting point.

The $E(t)$ which is obtained by completing this calculation loop provides a value of $E(t)$ closer to the electric field of the measured optical pulse than the original $E(t)$. The degree of its approximation is reflected in the differences of absolute values of three types of Fourier-transforms between before and after the substitutions. The calculation therefore should be repeated until the differences become sufficiently small.

The analysing method described as the third method, unlike the first and the second methods of this invention, is not limited in effectiveness to symmetric pulses. Rather, pulses of any arbitrary intensity shapes and phase shapes can be analyzed.

As stated in the foregoing, the method according to the present invention method measures ultrashort optical pulses and can measure the intensity shape and phase shape of pulses by using a compact and less expensive measuring system with a precision higher than conventional methods. As the techniques of this invention can obtain the pulse phase in extreme detail, it can be effectively applied in the measurement of optical pulses before and after passing through an optical fiber transmission line to observe the intensity and phase shapes thereof. This allows a direct and simplified evaluation of characteristics of optical fiber lines. Moreover, this invention is generally applicable in optical systems and optical materials.

This invention which allows detailed observation of pulse phase provides an effective means in optimization and adjustment of pulse compressors with optical fibers.

This invention is a basic method applicable in a wide variety of fields concerning generation, formation, propagation, etc. of ultrashort pulses.

BRIEF DESCRIPTION OF THE DRAWINGS

An exemplary and presently preferred embodiment of the invention will be described in detail with reference to the accompanying drawings, wherein:

FIG. 16 is a graph showing the intensity shape and phase shape of the measured pulse obtained by analysing measured data according to the third embodiment method.

DESCRIPTION OF THE PREFERRED EMBODIMENTS

Figure 1:
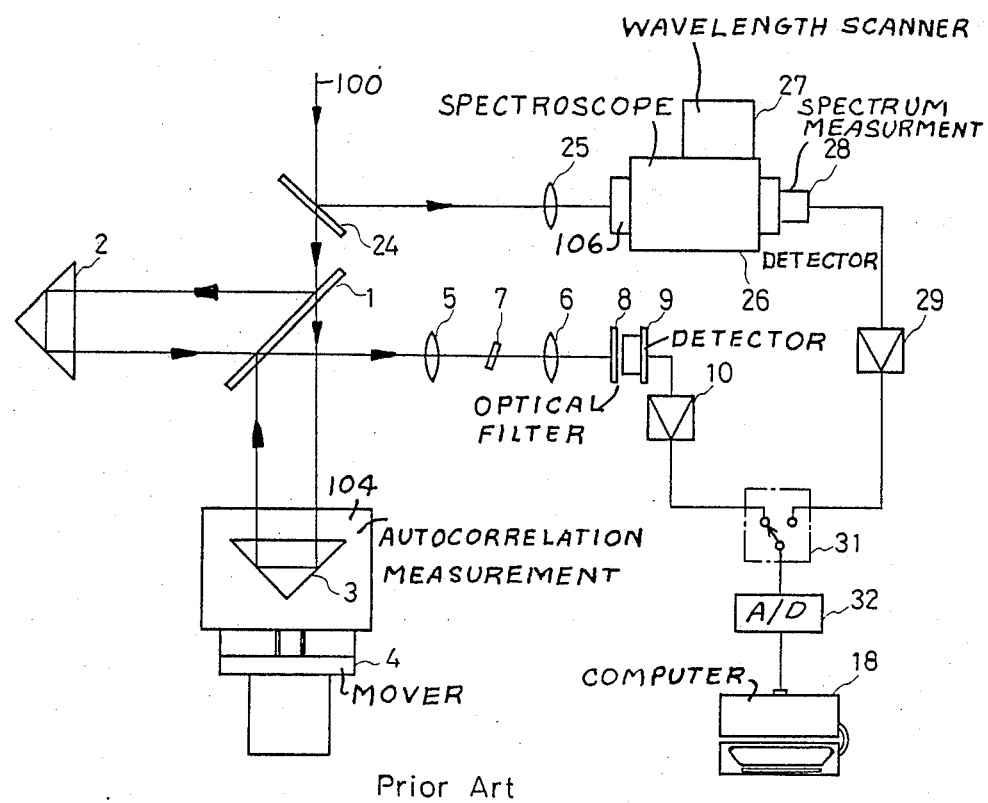
FIG. 1 is a block diagram of a prior art ultrashort optical pulse measurement system.
Figure 2:
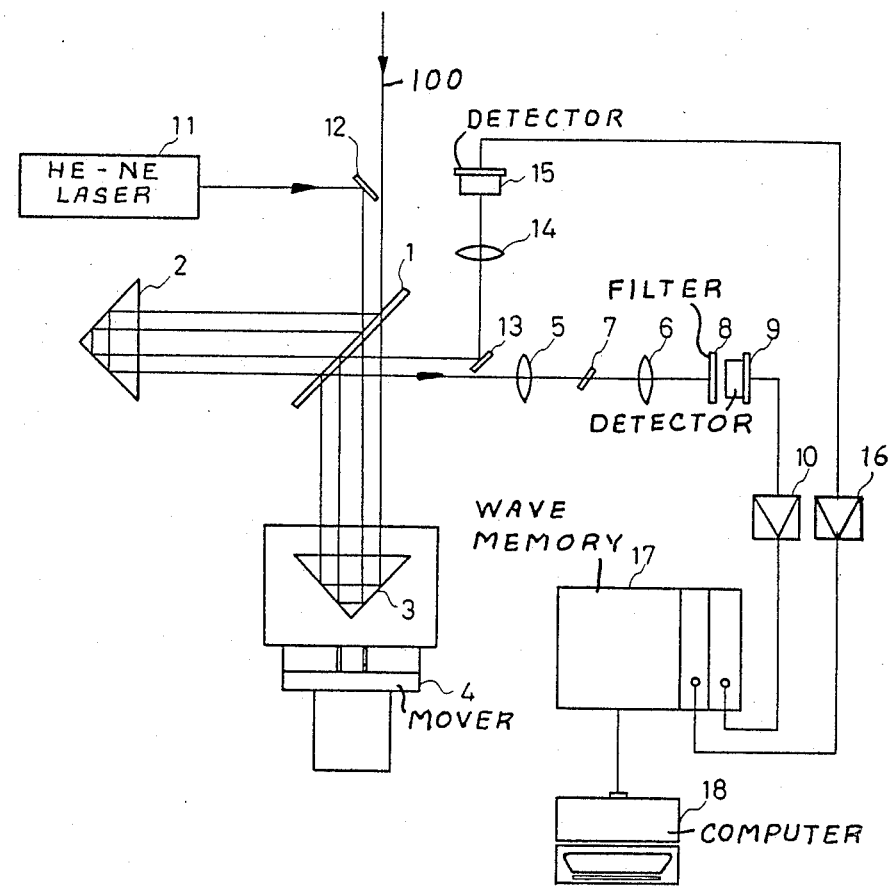
FIG. 2 is a block diagram of the ultrashort optical pulse measurement system according to the first embodiment of this invention.

FIG. 2 shows the first embodiment of the present invention. This system realizes the method for measuring ultrashort optical pulses according to this invention.

The system shown in the figure includes a Michelson interferometer comprising a beam splitter 1, a fixed prism 2 and a prism 3 which can be moved by a mover 4. The light from He-Ne laser 11 is used for calibrating the relative path difference in the interferometer. The output of laser 11, and the light beam to be measured 100 are adapted to enter the Michelson interferometer in parallel. The He-Ne laser beam outputted from the interferometer is reflected by a mirror 13 and a lens 14 into a Si optical detector 15, which produces and outputs electric signals proportional to the light intensity. This output is amplified by an amplifier 16 and fed to one of a plurality of channels of a wave memory 17.

The light beam to be measured 100 is input into the interferometer in parallel with the output of laser 11. This light beam is split by beam splitter 1. A portion of light beam 100 is then reflected to prism 2, while the remainder is reflected through prism 3. The light beam is again reconstituted by beam splitter 1, and directed towards lens 5. Lens 5 converges this light beam into doubling crystal 7. Crystal 7 is a crystal of the type having the so-called doubling ability, and therefore generates a second-harmonic of the input light beam. The crystal 7 may be, for instance, a lithium iodate crystal.

The light emanating from crystal 7 is directed to lens 6, which converges the light toward an optical detector 9. Filter 8 is provided between lens 6 and detector 9, to ensure that only the second-harmonic light enters optical detector 9. The optical detector 9 outputs voltage pulses in response to the input light, each such pulse having an area proportional to the energy of the second-harmonic light input thereinto. Thus, detector 9 performs a time integration of the pulse shapes. The voltage pulses are amplified by an integrating amplifier 10 to produce a signal proportional to the input signal and fed to another channel of the wave memory 17. The wave memory 17 is connected to a computer 18 which reads out and analyses the stored data after measurement.

This ultrashort pulse measurement system described above operates as follows.

While the mover 4 moves at a constant speed V, output voltages from the amplifier 16 (representing reference laser 11) and from integrating amplifier 10 (representing light to be measured 100) are measured and recorded by the wave memory 17 at a predetermined sampling interval. The sampling interval $\Delta t$, the time constant T of the integrating amplifier 10, the repetition period P of the pulses to be measured, and the speed of the mover V are determined in such a way that they satisfy the following relation.

$$P << T << \Delta t << \frac{\lambda_0}{(2V)} \quad (26)$$

wherein $\lambda_0$ denotes the central wavelength of the pulses to be measured.

Figure 4:
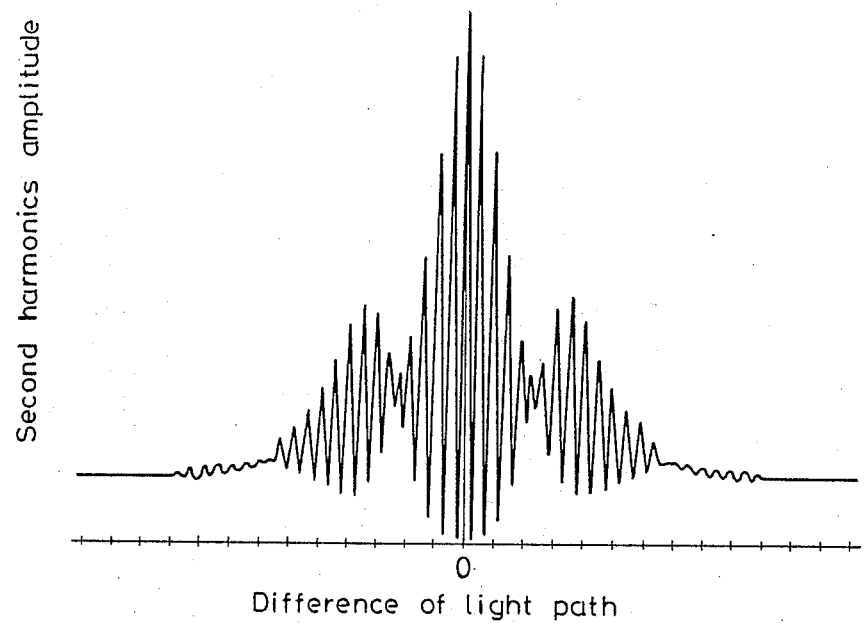
FIG. 4 is a graph showing the result of measurement of the first embodiment of this invention.

During a subsequent analyzing step to analyze this data, a computer 18 obtains data indicative of changes in the output voltages from integrating amplifier 16 and the integrating amplifier 10. The computer obtains these voltages from wave memory 17 where they are stored. This information is used to correct distortions occurring in the various output voltages. By using changes that occur in the characteristic of the output of reference laser 11, the output indicative of measured light 100 can be corrected. Therefore, distortions caused by irregularities and fluctuations in the speed of mover 4 can be corrected. Once this is done, the correlation data can be obtained as shown in FIG. 4.

The pairs of data which are stored in the wave memory 17 are distorted owing to fluctuation of delay time of data corresponding to the fluctuation of scan velocity. However, two pairs of data have a same value of distortion. If no distortion owing to fluctuation exists, the output of the amplifier 16 is sinusoidal. Therefore, the distorted value can be determined from the output of the amplifier 16. This distortion value is applied to the output signal of the integrating amplifier 10 in order to compensate for the distortion. FIG. 4 shows an example of output data (correlation data) of the integrating amplifier 10, the distortion of which is compensated.

Figure 5:
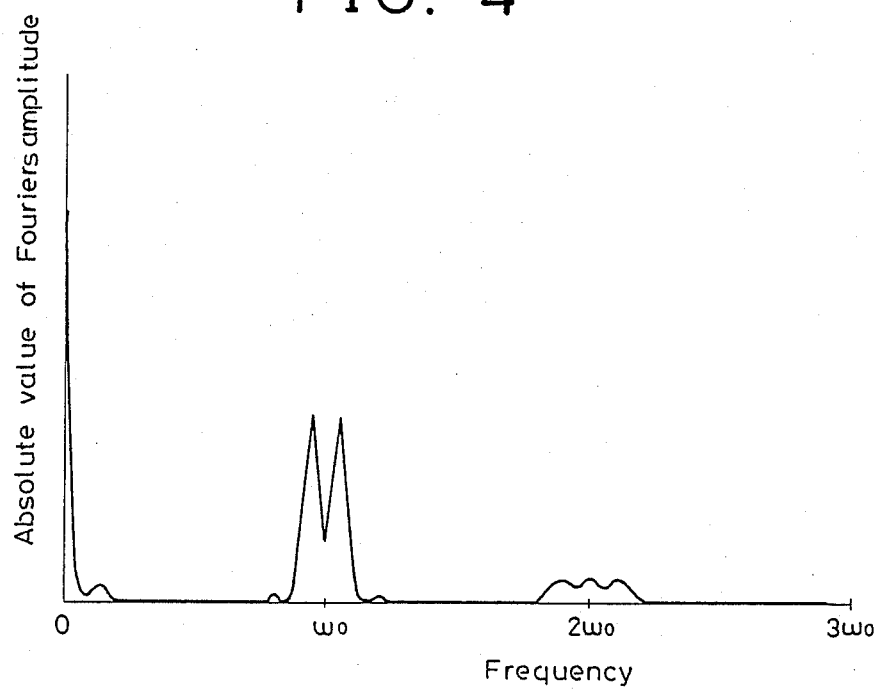
FIG. 5 is a graph showing the result of Fourier analysis of the measurement result conducted in FIG. 4.

FIG. 5 shows the spectrum obtained by performing a Fourier transformation on the data; wherein $\omega_0$ represents the interference fringe frequency of the basic wave. The relation between $f_0$ and $\omega_0$ which are defined by the equation (1) holds, that is:

$$f_0 = \frac{1}{2\pi} \frac{2V}{c} \omega_0$$

Using the spectra shown in FIG. 5, the peak closest to zero frequency corresponds to the Fourier-transformed intensity autocorrelation $G_2(\tau)$, that is $$\int_{-\infty}^{\infty} G_2(\tau) \exp(i\omega\tau) d\tau \quad (27)$$

Using this relation (27), the intensity shape I(t) of the pulse can be calculated in accordance with equation (11) as $$I(t) = \int_{-\infty}^{\infty} \left[ \int_{-\infty}^{\infty} G(\tau) \exp(i\omega\tau) d\tau \right]^{\frac{1}{2}} \exp(-i\omega\tau) d\tau \quad (11)$$

Among the three spectra, the peak closest to the frequency $2\omega_0$ corresponds to $|\overline{S}(\omega)|^2$. Thus, the pulse phase can be calculated by performing an iterative calculation according to equation (14) using its square root and the aforementioned I(t)

$$\exp(2i\phi_{k+1}) = \arg\{F|S|\arg(F[I \exp(2i\phi_k)])\} \quad (14)$$

Figure 6:
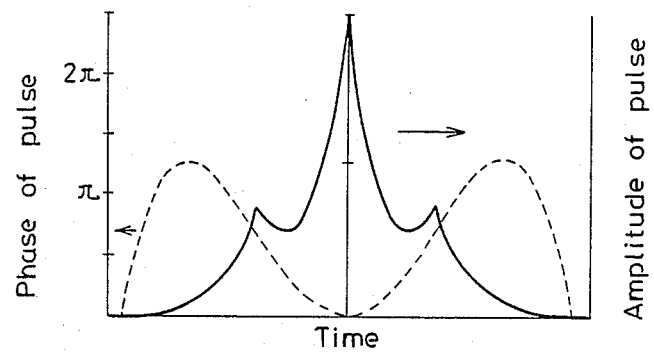
FIG. 6 is a graph showing the intensity shape and phase shape of the original pulse used for verification of the first and second embodiment analysis methods.

In order to verify the above-mentioned analysis method, assuming the pulse has intensity and phase shapes shown in FIG. 6, the second-harmonic light intensity variation is calculated in accordance with the equation (8), and then the obtained result is analyzed by the present method.

Figure 8:
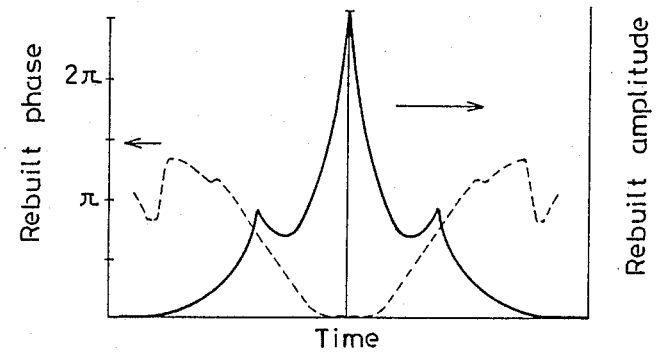
FIG. 8 is a view showing the intensity shape an phase shape of the pulse reconstructed by the first and second embodiments of this invention.

FIG. 8 shows the phase of the intensity shape obtained by this analysis. This demonstrates that the intensity shape was fully reproduced at high precision, and that the phase was also reproduced at high precision with the exception of the leading and trailing edges of the pulses of low intensity.

The measurement method of this embodiment can be effectively used to measure optical pulses which have a width much shorter than the period of its optical oscillation. For instance, pulses having a width in the range from 10 fs to 60 fs can be measured against a central wavelength of 0.6 μm. If this method is applied to optical pulses having a wider width, the capacity required for the wave memory 17 and the computer 18 would have to be increased.

In order to obviate such a problem of increased memory, a second embodiment of the present invention is provided. This second embodiment can be used for optical pulses having a wider width than that relation discussed above, without a consequent increase in the amount of necessary memory. However, this second embodiment will not be as accurate when used for pulses having an extremely short width. Therefore, it can be seen that the first and second embodiment are each suited for different environments—the first embodiment being suited for a pulse with a relatively narrow width, and the second embodiment being suited for a pulse with a relatively wide width.

Figure 3:
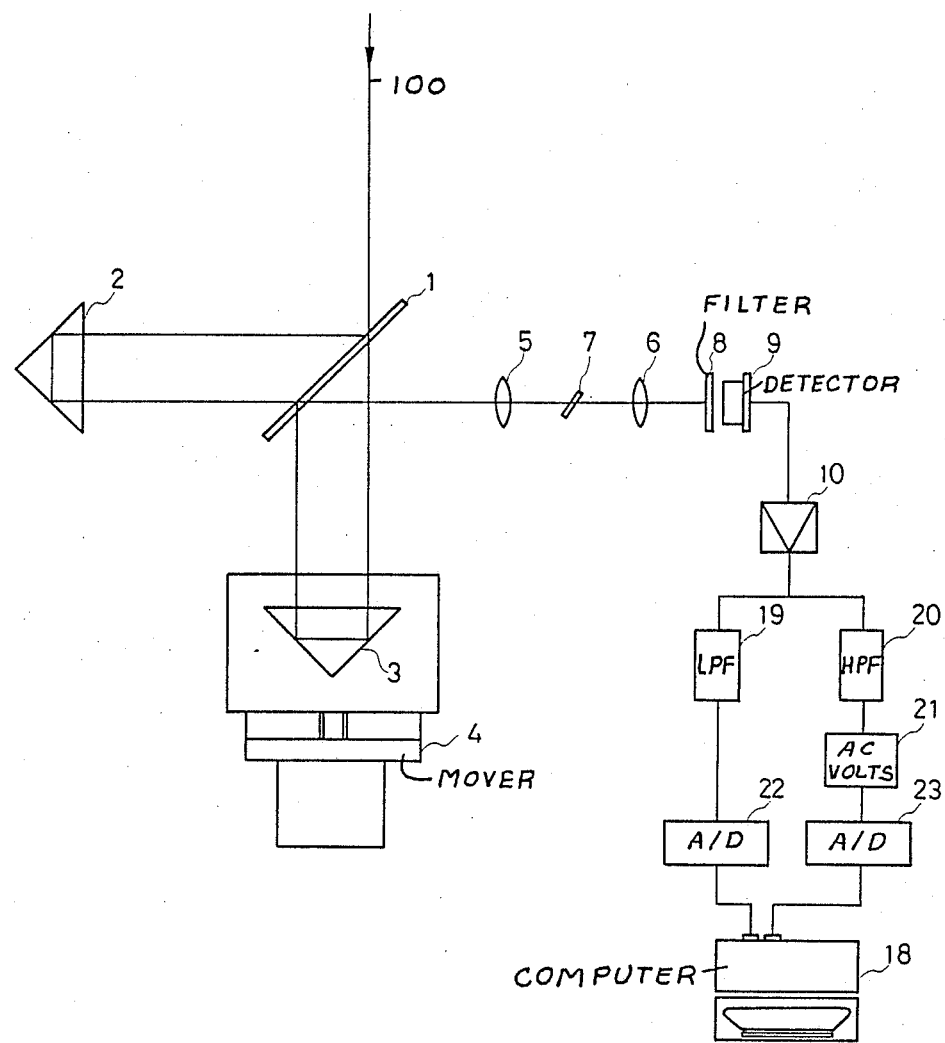
FIG. 3 is a block diagram of the ultrashort optical pulse measurement system according to the second embodiment of this invention.

FIG. 3 shows this second embodiment of the structure of the system to realize an ultrashort pulse measurement method according to this invention.

The system show comprises a Michelson interferometer similar to the one used in the first embodiment, a crystal 7 having a doubling ability, filter 8 and an optical detector 9. The voltage pulses generated in the optical detector 9 are amplified by an integrating amplifier 10 to produce a signal proportional to the input signal, and fed in parallel to a low pass filter (LPF) 19 and a high pass filter (HPF) 20. The output voltage from low pass filter 19 is converted to digital by A/D converter 22, read and then stored in computer 18. The output AC voltage from high pass filter 20 is fed to an AC voltmeter 21, detected, and converted into a voltage corresponding to the amplitude of the AC voltage. This voltage is then converted to digital by A/D converter 23, and read-in and stored in the computer 18.

The operation of the above-described second embodiment ultrashort optical pulse measurement system will be described herein.

While moving mover 4 at a constant speed V, the outputs from A/D converters 22, 23 are read-in and stored in computer 18 at a predetermined interval. The time constant T of the integrating amplifier 10, the repetition pitch of the pulse P and the speed of the mover V are determined in a way so that they satisfy the following relation.

$$P \ll T \ll \Delta t \ll \frac{\lambda_0}{(2V)} \qquad (28)$$

The interval of reading-in of data may be arbitrarily determined to be as long as desired. The cutoff frequency $f_{LP}$ of the low pass filter and the cutoff frequency $f_{HP}$ are determined to satisfy the relation $$f_{LP} < f_0 < f_{HP} \qquad (29)$$

where ($f_0$ is defined by the equation (1)).

As mentioned above, this embodiment method allows the intervals between reading-in of data to be set to any value, arbitrarily long. Therefore, this invention method is applicable to the measurement of pulses irrespective of their width, still maintaining a predetermined memory capacity. In this embodiment, the variable components close to the frequencies 0, $f_0$, $2f_0$ of the voltages generated by optical detector 9 are separated by filters to obtain coefficients of each term of equation (8). Therefore, if the width of a pulse is extremely short and if $G_2(\tau)$, $F_1(\tau)$, $F_2(\tau)$ change rapidly, errors inevitably are caused by the deformation of $G_2(\tau)$ and $F_2(\tau)$ on the frequency characteristics of the filters. The lower limit of the pulse width to which this embodiment method is applicable is more than ten times of the optical oscillation period.

Figure 7:
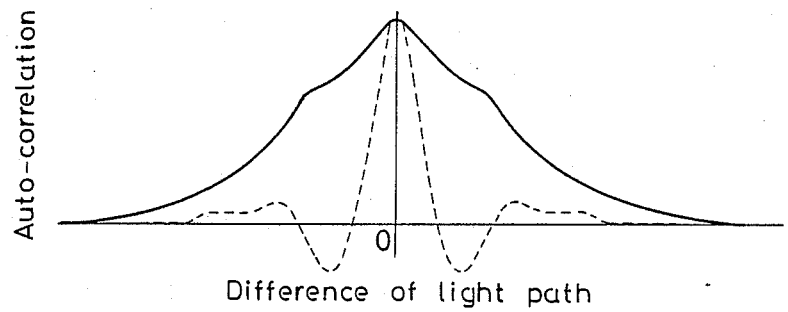
FIG. 7 is a graph showing the measurement result of the second embodiment system.

Two types of autocorrelation data are obtained, as shown in FIG. 7. In FIG. 7, the solid line represents the intensity autocorrelation shape $G_2(\tau)$ of the low pass filter. The AC voltmeter indicates $F_2(\omega)$. By detecting the point where the indicated value becomes zero, the wave shape measured at the point is folded at the horizontal axis to obtain $F_2(\tau)$.

At the subsequent analytic step, a calculation is conducted in accordance with equation (11) and using the data $G_2(\tau)$ to obtain the intensity shape I(t) of the pulse. An iterative calculation is then conducted in accordance with equation (14) and using I(t) and the square root of $|\bar{S}(\omega)|^2$ calculated by equation (12) with the data $F_2(\tau)$ to obtain the pulse phase.

In order to verify this invention analysis method, the inventors used a pulse having the intensity shape and phase shown in FIG. 6. $G_2(\tau)$ and $F_2(\tau)$ were calculated in accordance with equations (2) and (10) and the result was analysed by the aforementioned method. As the original pulse was identical to the one used in the first embodiment method verification, the resultant intensity shape and phase were exactly the same as those obtained in the first embodiment as shown in FIG. 8. This confirmed that the intensity shape can be accurately reproduced, and that the phase can also be reproduced with high precision, except for the leading and trailing portions of a pulse.

Figure 9:
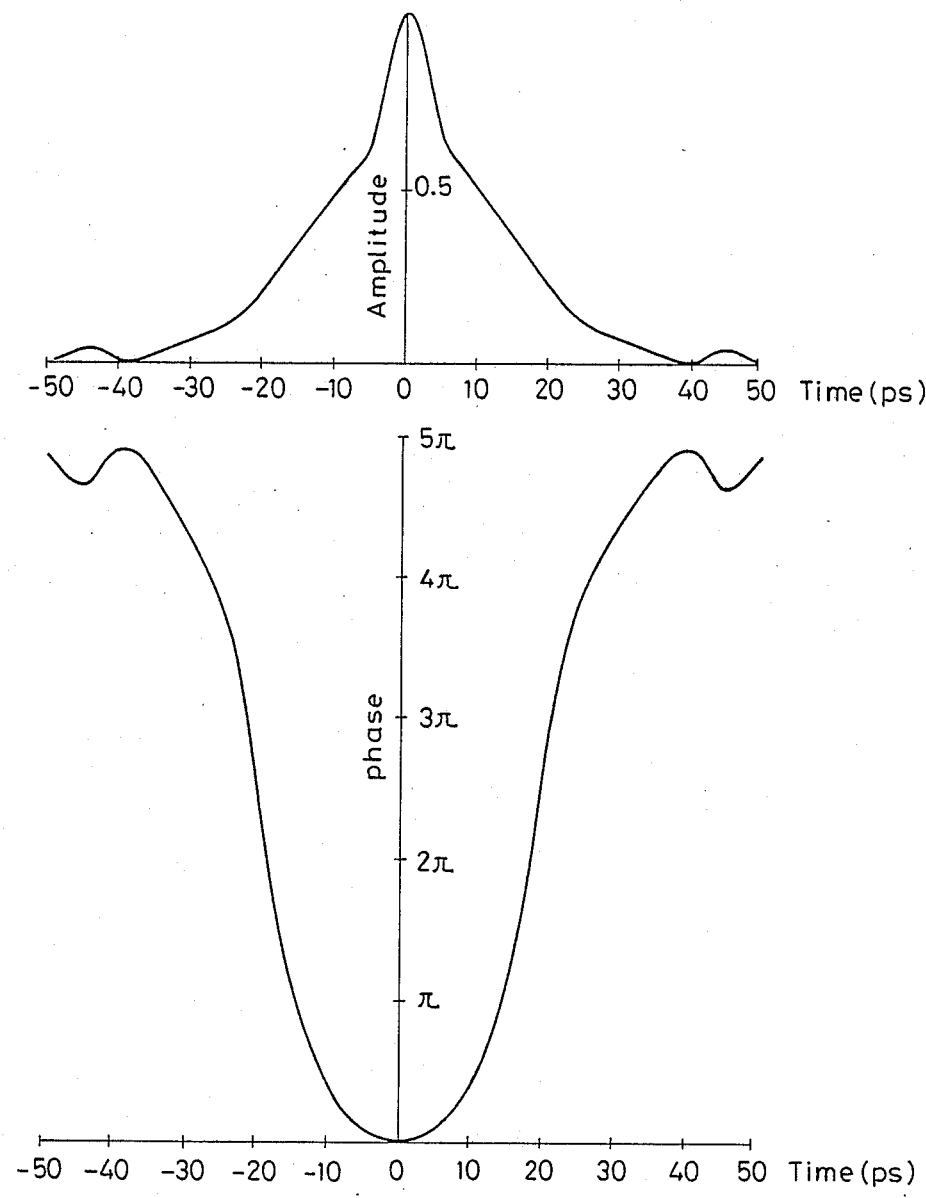
FIG. 9 is a graph showing the intensity shape and phase shape of the measured pulse obtained by analysing the data in the second embodiment of this invention.

FIG. 9 shows the intensity shape and phase obtained by measuring optical pulses generated from a semiconductor laser by the method of this invention. The semiconductor laser was an InGaAsP laser having a wavelength of 1.3 μm, and pulses were generated by superimposing a 200 MHz sine wave as a modulation on an injected electric current. The speed V of the mover was 1.55 mm/min, the cutoff frequency of the low pass filter was 10 Hz and the cutoff frequency of the high pass filter was determined to be 70 Hz for the subject frequency $f_0 = 40$ Hz in correspondence to the interference fringe frequency of the fundamental wave.

The result of the analysis shown in FIG. 9 demonstrates that the pulse has an intensity shape with moderate leading and trailing portions and has a parabolic-shaped phase with a large range up to the point where the intensity drops to one fifth of the peak.

Figure 10:
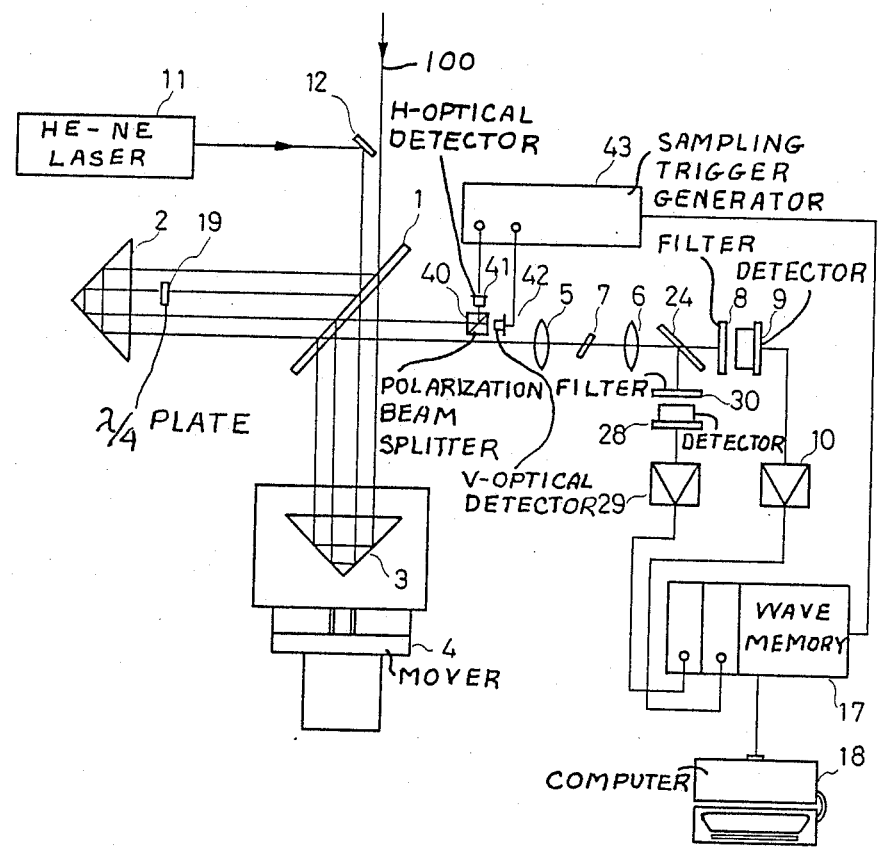
FIG. 10 is a block diagram of the ultrashort optical pulse measurement system according to the third embodiment of this invention.

FIG. 10 shows a third embodiment of the structure of the system to realize the third method for measuring ultrashort pulses.

This system includes a Michelson interferometer comprising a beam splitter 1, a fixed prism 2, and a prism 3 movable by a mover 4. The light from a He-Ne laser 11 is used to calibrate the relative path difference of the interferometer. The light beam to be measured 100 enters the Michelson interferometer parallel to the laser beam. The laser beam includes a linear polarized light having an angle of 45° with respect to the horizontal surface. The polarized light passes through a quarter-wave plate 19 placed on an arm of the interferometer and exits oriented such that the axis faces the vertical direction. The He-Ne laser light, after passing through the interferometer, enters a polarization beam splitter 40 which separates vertically polarized light from horizontally polarized light.. The separated light is respectively guided into optical detectors 41, 42, such that vertically polarized light is input into optical detector 41 and horizontally polarized light is input into optical detector 42. Each of these detectors outputs electrical signals which are proportional to the optical intensity of the respective input polarized lights. These outputs are routed to a sampling trigger generator 43. The sampling trigger generator extracts the AC components of both inputs and generates triggering pulses every time the AC component passes a zero value. In this manner, when the relative path difference of the interferometer changes by 0.63 μm (which is equivalent to the wavelength of the He-Ne laser), a triggering pulse is generated. Thus, a total of four triggering pulses are generated every 0.25×0.63 μm. Each triggering pulse is supplied to a wave memory 17, which in turn records the input voltage of respective channels (which will be described below) by sampling them each time a triggering pulse is generated.

The pulse beam to be measured passes through the interferometer on a path that does not pass through the quarter-wave plate 19. The light is then focused in a doubling crystal 7 (for instance a lithium iodate crystal) which generates second-harmonics. The light emanating from the crystal 7 is converged by a lens 6 and then divided by beam splitter 24. Second-harmonic light, having a frequency twice that of the measured pulse beam (or one-half of the wavelength thereof), is extracted from one of the split beams by the optical filter 8 and converged at the optical detector 9. Only the unconverted fundamental wave light of the same wavelength as the measured pulse beam 100 is extracted from the other beam by optical filter 30. This light is then converged at an optical detector 28. Therefore, optical detector 9 outputs a voltage pulse that has an area proportional to the energy of the second-harmonic of the measured pulse 100. Similarly, optical detector 28 outputs a voltage pulse that has an area proportional to the energy of the fundamental wave. Both of these detectors perform a time integration type function. These voltage pulses are transformed to voltages proportional to said areas by integrating amplifiers 10 and 29, and then inputted to the first and second channels, respectively, of wave memory 17. The wave memory 17 is connected to a computer 18, which reads out stored data and analyses this data after measurement.

The above description describes the measuring operation at one position of the movable prism or, in other words, at one point of a relative path difference. Actually, however, the mover 4 moves at a constant rate V, and values are sampled every time the wavelength $\lambda_{ref}$ of He-Ne laser 11 or the reference of the path length difference of the interferometer changes by one-fourth, and the data are stored in a wave memory 17.

The time constant T of integrating amplifiers 10 and 29, the repetition period P of the measured pulses, and the speed V of the mover are determined so that they satisfy the relation below.

$$P << T << \frac{\lambda_{ref}}{8V} \quad (30)$$

The wavelength of the reference laser $\lambda_{ref}$ should be shorter than the central wavelength of the measured pulse $\lambda_0$. This is because while sampling is performed once every time the relative path difference of the interferometer changes by ¼ $\lambda_{ref}$, sampling should be conducted at least twice every time the relative path difference changes by ½ $\lambda_0$ in order to precisely observe second harmonics having the wavelength of $\lambda_0/2$; i.e. one-half of the fundamental wave or $\lambda_0$. This enables the measurement of an optical pulse having a central wavelength longer than 0.63 μm if a He-Ne laser of wavelength of 0.63 μm is used as the reference of the path difference of the interferometer. For measuring shorter wavelength optical pulses, lasers having shorter oscillation wavelengths should be used as the reference.

Figure 11A:
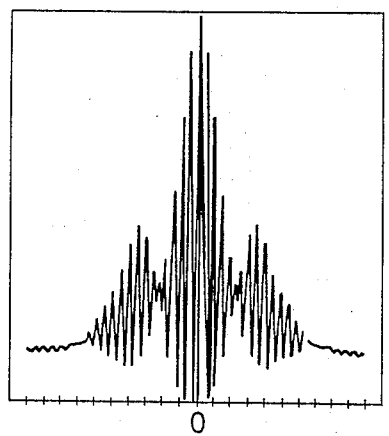
FIGS. 11##A-D are graphs showing the result of the data and Fourier analysis conducted by the third embodiment method.
Figure 11B:
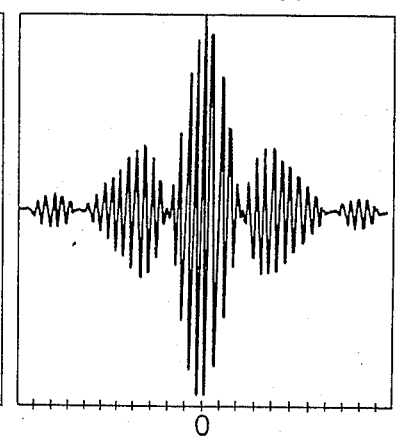

In the analyzing step, a computer reads-in the changes in output voltages from the integrating amplifiers 10 and 29 which are stored in the wave memory 17. These two sets of data are the autocorrelation data shown in FIGS. 11A and 11B.

Figure 11C:
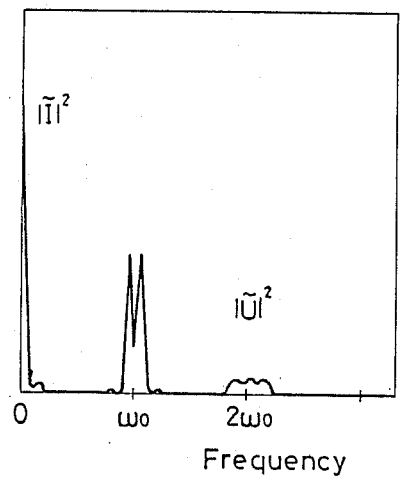
Figure 11D:
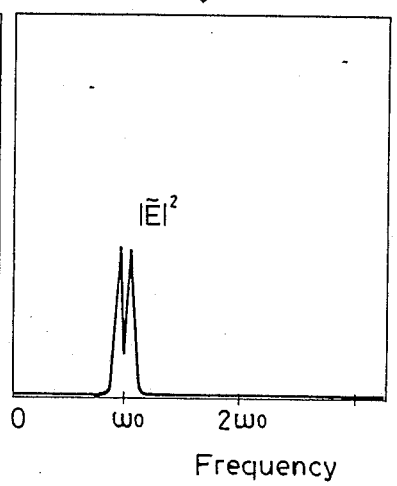
Figure 12:
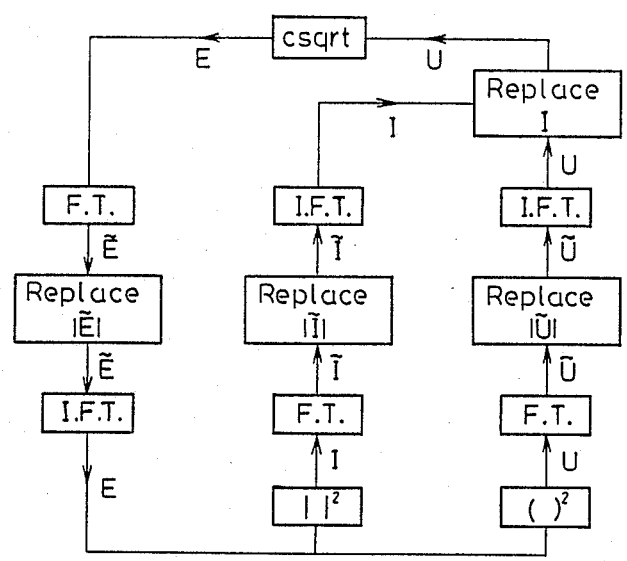
FIG. 12 is a flow chart showing the iterative calculation method for reconstructing the subject pulse from the result of Fourier analysis.

FIGS. 11C and 11D show the spectrum obtained by Fourier-transforming the data. By conducting an iterative calculation shown in FIG. 12 using the spectrum close to DC, and close to $2\omega_0$, in FIG. 11C graph, and the spectrum close to $\omega_0$ in FIG. 11D, the intensity shape and phase shape of pulses can be obtained. $|\bar{u}(\omega)^2$ in equation (25) is obtained by translating the spectrum close to $2\omega_0$ by $-2\omega_0$ while $|\bar{E}(\omega)|^2$ in equation (18) is obtained by translating the spectrum close to $\omega_0$ by $-\omega_0$.

In order to prove the effectiveness of the above analysis method, the inventors have calculated $|\bar{I}(\omega)|$, $|\bar{u}(\omega)|$, and $|\bar{E}(\omega)|$ for pulses (original shapes) having various intensity shapes and phase shapes, and the intensity shape and phase shape are reproduced by said analysis method. The result is shown together with the original shapes in FIGS. 13 through 15.

FIG. 13(b) through FIG. 15(b) show calculated data for each original shape from which an iterative calculation is conducted.

Figure 13A:
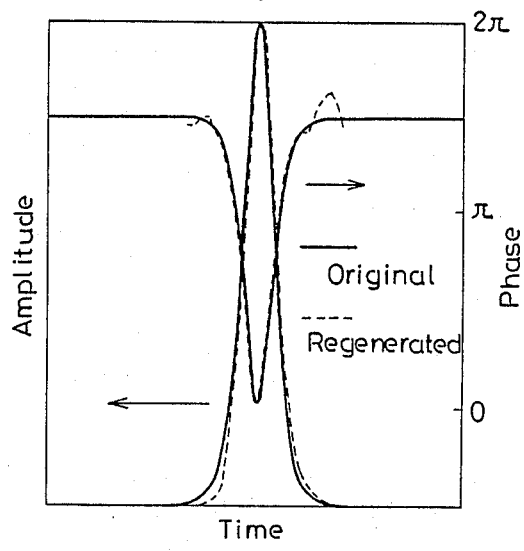
FIGS. 13(a), 13(b), 14(a), 14(b), 15(a) and 15(b) are graphs showing the intensity shapes and phase shapes of the various original pulses used for verification of the analysis method of the third embodiment, data groups used for analysis and the intensity shape and phase shape (dotted line) of the pulse reconstructed from the data.
Figure 13B:
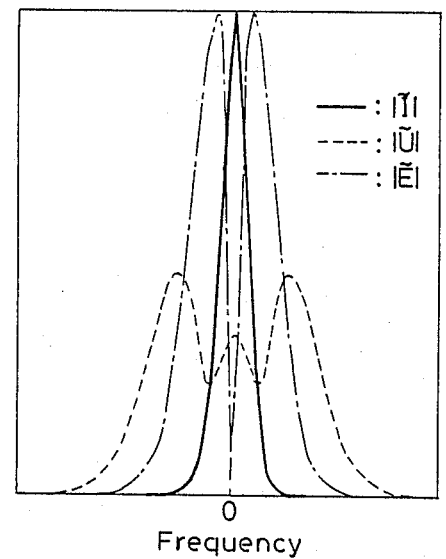
Figure 14A:
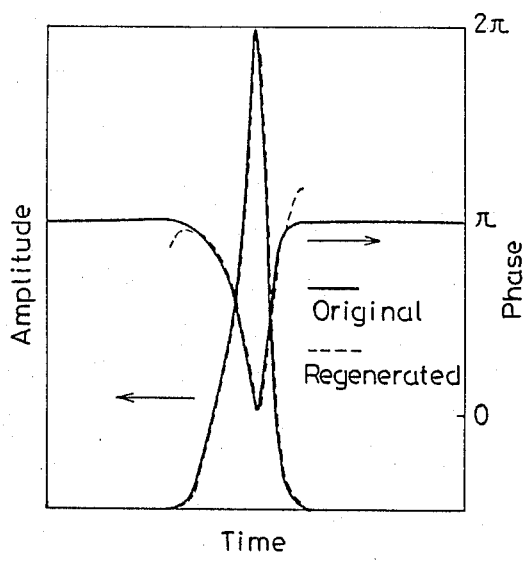
Figure 14B:
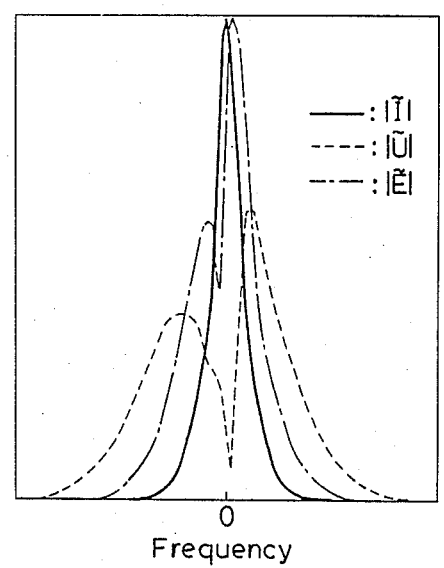
Figure 15A:
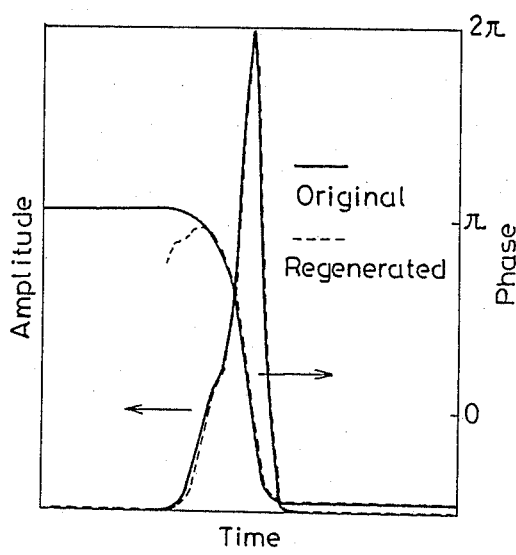
Figure 15B:
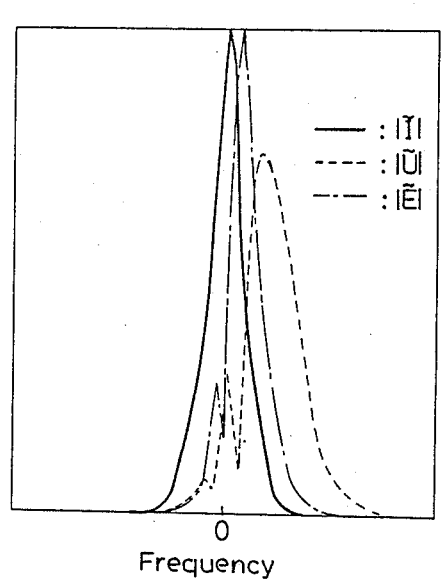

FIGS. 13(a) and 13(b) show a case where the original shape is symmetrical, while FIGS. 14(a) and 14(b) and 15(a) and 15(b) show the case where the original intensity shape and original phase shape are asymmetrical. Both intensity shapes and phase shapes were reproduced at a high precision from these pulses thus proving that even if the pulses were asymmetrical, the reproduction precision is not deteriorated.

FIG. 16 shows the intensity shapes and phase shapes which were obtained by measuring optical pulses generated by a semiconductor laser by this embodiment method. The semiconductor laser used was an InGaAsP-DFB laser having a 1.3 μm wavelength. A 200 MHz sine wave was modulated on the injected electric current to thereby generate pulses of the width in the range of 20–30 ps, and a repetitive period of the pulse P=5 ns. The measurement was performed under the conditions that the speed of the mover V was 3.88 mm/min, and the interference fringe which repeats itself at the wavelength of fundamental wave appears in the signals at the frequency below.

$$\frac{2V}{\lambda_0} = \frac{2 \times 3.88/60}{1.3 \times 10^{-3}} = 99.5 \text{ Hz}$$

The time constant of the integrating amplifiers was determined at ca. 100 μs so as to satisfy equation (30). $\lambda_{ref}/(8V)$ was set around 1 ms while the repetitive pitch of the measured pulse P was 5 ns as described above.

The result of analysis in FIG. 16 indicates that the measured pulse had a precipitate rising and a moderate trailing and FWHM was 23 ps.

It also demonstrates that the phase shape changes in the form similar to those obtained by integrating the intensity shape.

The lower limit of the time width of the optical pulses which can be measured by this embodiment is about ten times the cycle of optical oscillation thereof. That is because three peaks should appear separately at a sufficiently large interval therebetween in order to achieve the spectrum analysis of the changes in the second-harmonic light intensity.

For instance, the lower limit in time width of the optical pulses of 1.3 μm bandwidth is around 40 fs ($40 \times 10^{15}$ s) and that of 0.6 μm bandwidth is set around 20 fs. There is no theoretical upper limit for the width of optical pulses which can be measured using this embodiment. Therefore, this method can measure all pulses, no matter how long their width may be. However, in practical use, the optical pulses which should be measured should be kept below 100 ps or thereabouts. By using pulses less than this width, the size of the measuring system can be minimized.

This invention method can measure all optical pulses as long as an appropriate doubling crystal exists. For instance, if a β-BaB$_2$O$_4$ (β-barium borate) crystal is used, this method can measure pulses of 0.4–2.5 μm wavelength and if a KTP (potassium tri-hydrophosphate) crystal is used, optical pulses with wavelengths of up to 4.2 μm can be measured.

As described in detail in the foregoing statement, this invention can be applied to optical pulses in a wide range of time scale and wavelength.

As this embodiment method can measure the intensity and phase shapes precisely and in detail even if the pulses are asymmetrical, it is extremely effective in alignment and evaluation of ultrashort pulse light sources.

Although only a few exemplary embodiments in this invention have been described in detail above, those skilled in the art will readily appreciate that many modifications are possible in the exemplary embodiments without materially departing from the novel teachings and advantages of this invention.

Accordingly, all such modifications are intended to be included within the scope of this invention as defined in the following claims.

What is claimed is:

1. A method for measuring ultrashort optical pulses, which are repetitive pulses at a fixed time interval, comprising the steps of:
   splitting a light beam to be measured into two beams;
   directing the two beams through different paths to provide a relative path length difference therebetween;
   recombining said two beams;
   doubling said recombined beam to produce a second-harmonic beam;
   processing said doubled beam to obtain spectra distributed at an interval of an interference fringe of a fundamental wave $\omega_0$;
   obtaining a spectrum near DC from among said spectra and calculating an intensity shape I(t) therefrom; and
   obtaining a spectrum near $2\omega_0$ from said spectra and calculating a pulse phase therefrom.

2. A method as in claim 1 wherein said processing step includes Fourier-analyzing said recombined beam to obtain three spectra distributed at an interval equivalent to a frequency of an interference fringe of said fundamental wave $\omega_0$.

3. A method as in claim 1 wherein said processing step and said obtaining a spectrum near DC step and said obtaining a spectrum near $2\omega_0$ step includes the steps of:
   converting an intensity of the second-harmonic light into a voltage;
   determining data indicative of the changes in the intensity of the second-harmonic light caused by said relative path length difference;
   Fourier-analysing the data thus obtained to obtain three spectra distributed at an interval equivalent to a frequency of an interference fringe of a fundamental wave;
   Fourier-transforming the square root of a first spectrum, closest to the zero frequency among said three spectra, in order to reconstruct the intensity shape of the object pulses; and
   reconstructing the phase of the object pulses by performing iterative calculations using a square root of the spectrum close to the frequency equivalent to double said interference fringe frequency of said fundamental wave and said reconstructed intensity shape.

4. A method as in claim 1 wherein said processing step includes the steps of low pass filtering said recombined beam to obtain a spectrum near DC, and high pass filtering said recombined beam to obtain a spectrum near AC.

5. A method as in claim 1 wherein said processing step, said obtaining a spectrum near DC step and said obtaining a spectrum near $2\omega_0$ step include the further steps of:
   transforming the intensity of the second-harmonic beam into a voltage;
   low pass filtering said voltage to extract a frequency component near DC;
   high pass filtering said voltage to extract a high pass frequency component near a measuring frequency equivalent to two times of an interference fringe frequency of the fundamental wave;
   measuring amplitudes of said high pass frequency component;
   recording thus obtained data about the voltage near DC and said high pass voltage in a time sequence while varying said relative path length difference at a constant rate;
   Fourier-analysing the data on the component near DC among the pair of sampled data trains;
   performing an inverse Fourier-transformation on the square root of the spectrum to reconstruct the intensity shape of the measured optical pulse;
   Fourier-analysing the data on the AC voltage; and
   reconstructing the phase of the measured optical pulse from the square root of the obtained spectrum and the reconstructed intensity shape by iterative computation.

6. A method as in claim 1 wherein said spectrum near DC corresponds to a Fourier-transformed intensity autocorrelation $G_2(\tau)$ of:

$$\int_{-\infty}^{\infty} G_2(\tau) \exp(i\omega\tau) d\tau \qquad (27)$$

and said intensity shape is obtained as:

$$I(t) = \int_{-\infty}^{\infty} \left[ \int_{-\infty}^{\infty} G(\tau) \exp(i\omega\tau) d\tau \right]^{\frac{1}{2}} \exp(-\omega\tau) d\tau \qquad (11)$$

7. A method is in claim 1 wherein said spectrum near $2\omega_0$ corresponds to $|\tilde{s}(\omega)|^2$, and the pulse phase is calculated by performing an iterative calculation according to:

$$= \arg \{F|S|\arg(F[I \exp(2i\phi_k)])\} \qquad (14)$$

8. A method for measuring ultrashort optical pulses which are repetitive pulses at a fixed time interval comprising the steps of:
splitting a light beam to be measured into two beams;
recombining said two split light beams while providing relative path length differences therebetween;
doubling said recombined beam to form a second-harmonic bean;
transforming intensities of a fundamental wave and said second-harmonic beam into electric signals proportional thereto;
recording changes in intensities of the fundamental wave and the second-harmonic light which are caused by said difference in said relative light path length; and
performing a Fourier-analysis on the recorded data to obtain the intensity shape and phase shape of the measured pulse.

9. The method for measuring ultrashort optical pulses as claimed in claim 8 comprising the further steps of obtaining a Fourier-transformed electric field of the measured optical pulse from the Fourier-analysed data on intensity change of the fundamental wave as the spectrum near the frequency of the fundamental wave $\omega_0$, obtaining a Fourier-transformed electric field of the second-harmonic light from the Fourier-analysed data on the intensity changes of the second-harmonic light as the spectrum near $2\omega_0$, obtaining Fourier-transformed intensity of the measured optical pulse as the spectrum near zero frequency, and performing iterative computation using said three Fourier-transformations.

10. Apparatus as in claim 8 wherein said spectrum near DC corresponds to a Fourier-transformed intensity autocorrelation $G_2(\tau)$ of:

$$\int_{-\infty}^{\infty} G_2(\tau) \exp(i\omega\tau) d\tau$$

and said intensity shape is obtained as:

$$I(t) = \int_{-\infty}^{\infty} \left[ \int_{-\infty}^{\infty} G(\tau) \exp(i\omega\tau) d\tau \right]^{\frac{1}{2}} \exp(-\omega t) dt$$

11. A method as in claim 8 wherein said spectrum near $2\omega_0$ corresponds to $|\tilde{s}(\omega)|^2$, and the pulse phase is calculated by performing an iterative calculation according to:

$$= \arg F|S|\arg (F[I \exp(2i\phi_k)])$$

12. A method for measuring ultrashort optical pulses, which are repetitive pulses at a fixed time interval, comprising the steps of:
splitting a light beam to be measured into two beams;
directing the two beams through different paths to provide a relative path length difference therebetween;
recombining said two beams;
doubling said recombined beam to produce a second-harmonic beam;
determining data indicative of the changes in the intensity of the second-harmonic light caused by said relative path length difference;
Fourier-analysing the data thus obtained to obtain three spectra distributed at an interval equivalent to a frequency of an interference fringe of a fundamental wave;
Fourier-transforming the square root of a first spectrum, closest to the zero frequency among said three spectra, in order to reconstruct the intensity shape of the object pulses; and
reconstructing the phase of the object pulses by performing iterative calculations using a square root of the spectrum close to the frequency equivalent to double said interference fringe frequency of said fundamental wave and said reconstructed intensity shape.

13. A method for measuring ultrashort optical pulses, which are repetitive pulses at a fixed time interval, comprising the steps of:
splitting a light beam to be measured into two beams;
directing the two beams through different paths to provide a relative path length difference therebetween;
recombining said two beams;
doubling said recombined beam to form a second-harmonic beam;
low pass filtering said voltage to extract a frequency component near DC;
high pass filtering said voltage to extract a high pass frequency component near a measuring frequency equivalent to two times of an interference fringe frequency of the fundamental wave $\omega_0$;
measuring said high pass frequency component;
recording thus obtained data about said frequency component near DC and said high pass frequency component in a time sequence while varying said relative path length difference at a constant rate;
Fourier-analyzing the data on said component near DC among the pair of sampled data trains;
performing an inverse Fourier-transformation on the square root of the spectrum to reconstruct the intensity shape of the measured optical pulse;
Fourier-analyzing the data on the AC voltage; and
reconstructing the phase of the measured optical pulse from the square root of the obtained spectrum and the reconstructed intensity shape by iterative computation.

14. A method as in claim 13 wherein said Fourier-transformed intensity and said Fourier-transformed electric field are calculated from the equations:

$$\int_{-\infty}^{\infty} G_2(\tau) \exp(i\omega\tau) d\tau = |\overline{T}(\omega)|^2 \quad (24)$$

$$\int_{-\infty}^{\infty} F_2(\tau) \exp(i\omega\tau) d\tau = |\overline{u}(\omega)|^2 \quad (25)$$

15. An apparatus for measuring ultrashort optical pulses, which are repetitive pulses at a fixed time interval, comprising:
   a Michelson inferometer, receiving a light beam to be measured and producing a recombined output beam;
   crystal means for doubling said recombined output to produce a second-harmonic beam;
   fringe extraction means for processing said recombined beam to obtain spectra distributed at an interval of an interference fringe of a fundamental wave $\omega_0$; and
   filter means for obtaining a spectrum near DC and a spectrum near $2\omega_0$ from among said spectra; and
   means for calculating an intensity shape I(t) from said spectrum near DC and calculating a pulse phase from said spectrum near $2\omega_0$.

16. An apparatus as in claim 15 wherein said fringe extracting means includes means for Fourier-analyzing said recombined beam to obtain three spectra distributed at an interval equivalent to a frequency of an interference fringe of said fundamental wave $\omega_0$.

17. An apparatus as in claim 15 wherein said fringe extracting means includes:
   (a) means for converting an intensity of the second-harmonic light into a voltage;
   (b) means for determining data indicative of the changes in the intensity of the second-harmonic light caused by said relative path length difference; and
   (c) means for Fourier-analyzing the data thus obtained to obtain three spectra distributed at an interval equivalent to a frequency of an interference fringe of a fundamental wave;
   and said calculating means comprises:
   (a) means for Fourier-transforming the square root of a first spectrum, closest to the zero frequency among said three spectra, in order to reconstruct the intensity shape of the object pulses; and
   (b) means for reconstructing the phase of the object pulses by performing iterative calculations using a square root of the spectrum close to the frequency equivalent to double said interference fringe frequency of said fundamental wave and said reconstructed intensity shape.

18. Apparatus as in claim 15 wherein said filtering means includes LPF means for low pass filtering said recombined beam to obtain a spectrum near DC, and HPF means for high pass filtering said
   recombined beam to obtain a spectrum near $2\omega_0$.

19. Apparatus as in claim 15, wherein said filtering means comprises:
   means for transforming the intensity of the second-harmonic beam into a voltage;
   means for low pass filtering said voltage to extract a frequency component near DC; and
   means for high pass filtering said voltage to extract a high pass frequency component near a measuring frequency equivalent to two times of an interference fringe frequency of the fundamental wave;
   and said calculating means includes
   (a) means for measuring amplitudes of said high pass frequency component;
   (b) means for recording thus obtained data about the voltage near DC and said high pass voltage in a time sequence while varying said relative path length difference at a constant rate;
   (c) means for Fourier-analyzing the data on the component near DC among the pair of sampled data trains;
   (d) means for performing an inverse Fourier-transformation on the square root of the spectrum to reconstruct the intensity shape of the measured optical pulse;
   (e) means for Fourier-analyzing the data on the AC voltage, and
   (f) means for reconstructing the phrase of the measured optical impulse from the square root of the obtained spectrum and the reconstructed intensity shape by iterative computation.

20. Apparatus as in claim 15 wherein said spectrum near DC corresponds to a Fourier-transformed intensity autocorrelation $G_2(\tau)$ of:

$$\int_{\infty}^{\infty} G_2(\tau) \exp(i\omega\tau) d\tau$$

and said intensity shape is obtained as:

$$I(t) = \int_{-\infty}^{\infty} \left\{ \int_{-\infty}^{\infty} G(\tau) \exp(i\omega\tau) d[\tau \right\}^{\frac{1}{2}} \exp(-\omega t) dt$$

21. An apparatus as in claim 15 wherein said spectrum near $2\omega_0$ corresponds to $|s(\omega)|^2$, and the pulse phase is calculated by performing an iterative calculation according to:

$$=\arg\{F|S|\arg(F[I \exp(2i\phi)])\}(14)$$

22. An apparatus as in claim 15 wherein said Michelson inferometer comprises:
   means for splitting a light beam to be measured into two beams;
   means for directing the two beams through different paths to provide a relative path length difference therebetween; and
   means for recombining said two beams.

23. An apparatus for measuring ultrashort optical pulses which are repetitive pulses at a fixed time interval comprising:
   means for splitting a light beam to be measured into two beams;
   means for recombining said two split light beams while providing relative path length differences therebetween;
   means for doubling said recombined beam to form a second-harmonic beam;

means for transforming intensities of a fundamental wave and said second-harmonic beam into electric signals proportional thereto; and means for recording changes in intensities of the fundamental wave and the second-harmonic light which are caused by said difference in said relative light path length and performing a Fourier-analysis on the recorded data to obtain the intensity shape and phase shape of the measured pulse.

24. The apparatus for measuring ultrashort optical pulses as claimed in claim 23 wherein said recording means comprises means for (a) obtaining a Fourier-transformed electric field of the measured optical pulse from the Fourier-analyzed data on intensity change of the fundamental wave $\omega_0$, (b) obtaining a Fourier-transformed electric field of the second-harmonic light from the Fourier-analyzed data on the intensity changes of the second-harmonic light as the spectrum near $2\omega_0$, (c) obtaining Fourier-transformed intensity of the measured optical pulse as the spectrum near zero frequency, and (d) performing iterative computation using said three Fourier-transformations.

25. An apparatus for measuring ultrashort optical pulses, which are repetitive pulses at a fixed time interval, comprising:
means for splitting a light beam to be measure into two beams;
means for directing the two beams through different paths to provide a relative path length difference therebetween;
means for recombining said two beams;
means for doubling said recombined beam to produce a second-harmonic beam; and
calculating means for (1) determining data indicative of the changes in the intensity of the second-harmonic light caused by said relative path length difference, (2) Fourier-analyzing the data thus obtained to obtain three spectra distributed at an interval equivalent to a frequency of an interference fringe of a fundamental wave, (3) Fourier-transforming the square root of a first spectrum, closest to the zero frequency among said three spectra, in order to reconstruct the intensity shape of the object pulses, and (4) reconstructing the phase of the object pulses by performing iterative calculations using a square root of the spectrum close to the frequency equivalent to double said interference fringe frequency of said fundamental wave and said reconstructed intensity shape.

26. An apparatus for measuring ultrashort optical pulses, which are repetitive pulses at a fixed time interval, comprising the steps of:
means for (a) splitting a light beam to be measured into two beams, (b) directing the two beams through different paths to provide a relative path length difference therebetween, and (c) recombining said two beams;

27. An apparatus as in claim 26 wherein said transformed intensity and said Fourier-transformed electric field are calculated from the equations:

$$\int_{-\infty}^{\infty} G_2(\tau) \exp(I\omega\tau) d\tau = |I(\omega)|^2 \quad (24)$$

$$\int_{-\infty}^{\infty} F_2(\tau) \exp(i\omega\tau) d\tau = |I(\omega)|^2 \quad (25)$$

* * * * *